US010000357B2

(12) United States Patent
Brockman et al.

(10) Patent No.: US 10,000,357 B2
(45) Date of Patent: Jun. 19, 2018

(54) PASSIVE TENSIONING SYSTEM FOR COMPOSITE MATERIAL PAYOUT CONTROL

(71) Applicant: Fives Machining Systems, Inc., Fond du Lac, WI (US)

(72) Inventors: John Brockman, Cincinnati, OH (US); Milo Vaniglia, Cold Spring, KY (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 107 days.

(21) Appl. No.: 14/881,480

(22) Filed: Oct. 13, 2015

(65) Prior Publication Data

US 2017/0101286 A1 Apr. 13, 2017

(51) Int. Cl.
*B65H 59/06* (2006.01)
*B29C 70/30* (2006.01)
*B29C 70/38* (2006.01)
*B65H 59/36* (2006.01)
*B65H 59/04* (2006.01)

(52) U.S. Cl.
CPC .............. *B65H 59/06* (2013.01); *B29C 70/30* (2013.01); *B29C 70/384* (2013.01); *B65H 59/043* (2013.01); *B65H 59/36* (2013.01); *B65H 2701/31* (2013.01)

(58) Field of Classification Search
CPC ...... B65H 59/043; B65H 59/06; B65H 59/36; B29C 70/30; B29C 70/384
See application file for complete search history.

(56) References Cited

U.S. PATENT DOCUMENTS

2014/0238612 A1   8/2014   Vaniglia et al.

FOREIGN PATENT DOCUMENTS

| CN | 1693563 A | 9/2005 |
| JP | H06611 B2 | 1/1994 |
| JP | 2007069940 A | 3/2007 |
| WO | 2009093423 A1 | 7/2009 |

OTHER PUBLICATIONS

Machine Translation of JP H06-000611, Jan. 5, 1994.*
Machine Translation of JP 2007-69940, Mar. 22, 2007.*
Creel Specification. DU—Driven Unwind System. TexKimp—unwinding from package to process. http://www.texkimp.co.uk. Texkimp Ltd. Cheshire CW9 6GG, UK.
International Search Report and Written Opinion of the International Searching Authority for PCT/US2016/056408 dated Jan. 23, 2017.

* cited by examiner

*Primary Examiner* — William E Dondero
(74) *Attorney, Agent, or Firm* — Reising Ethington P.C.

(57) ABSTRACT

A passive tensioning system is disclosed for composite material that is dispensed by a composite placement machine. A spool is mounted on a spool shaft and material on the spool is pulled from the spool and applied to a surface. The tensioning system has a drag brake on the spool shaft and a drag brake control for the drag brake. A dancer roll is mounted on a linear slide having a spring force and a slide control is provided for the linear slide. A control system continually varies the drag brake control and the slide control to control the tension of the composite material based on the instantaneous operating characteristics of the composite placement machine.

18 Claims, 4 Drawing Sheets

PASSIVE TENSIONING SYSTEM FOR COMPOSITE MATERIAL PAYOUT CONTROL

FIELD

The device relates to a system for passively controlling the tension of tow as it is paid out from a creel to a composite placement head.

BACKGROUND

It is necessary to control the tension of tow material as it is paid out from a creel to a composite placement head. A tensioning system is active if it can provide back tension and has the ability to reverse the tow payout direction. Prior art active tensioning systems use bi-directional electronic servoed tensioners having a servo motor for each lane of tow to supply back tension and the ability to reverse the tow if required to take out slack during machine movements that decrease the distance between the head and the creel. The servoed tensioners add cost and complexity to the tow handling mechanism. A tensioning system is passive if it can only provide back tension and has no ability to reverse the tow payout direction. For pressure vessel and rocket motor case construction, simple passive tensioning systems are widely used for filament winding machine applications. Filament winding is a continuous process of pulling a tensioned fiber band from a plurality of spools in a creel. Filament winding machines wrap a wet resin fiber band or prepreg fiber band onto a smooth body of rotation having only convex surfaces so that no fiber bridging occurs. Such tensioning systems may use a simple spring on a dancer arm, and a braking mechanism on the spool. Filament winding tensioners provide tension levels of several pounds of force or higher since the shapes to be wound are usually symmetric, and are tightly wrapped in a continuous manner without stoppage. With the high tension levels, the effects of spool inertial loads are a manageable component for the passive spring design. Spring based tensioners for filament winding size material spools are not required to operate at a tension level of less than several pounds of force.

In the fiber placement process, it is necessary to place prepreg fiber bands in a discontinuous manner on lay-up tools that have concave areas and near net shape perimeters. The fiber placement process requires frequent starts and stops of the fiber band application. Due to these requirements it is necessary for the fiber placement tensioners to be able to provide low tensions in the magnitude of less than 1 pound, and with a quarter-pound tolerance. This is necessary so the fiber band will not bridge (stretch across the valleys) as it is laminated by a compaction roller onto concave areas of the tool surface. It is not possible at the low tensions used in the fiber placement process to control passive units sufficiently to buffer rapid tow acceleration and deceleration changes and resulting spool inertial loads with fine enough resolution for the fiber placement process. The amount of tension spike buffering from spring loaded dancer rolls on passive tensioners is not adequate for the fiber placement process. Prior art passive tensioning systems cannot adapt to changing spool diameters and changing accelerations and decelerations needed for feeding the tow and stopping the tow during fiber placement operations. When the material spools and tensioners are integrated into the head, it becomes necessary for tensioner and its dancer roll motion to be immune to changing gravity vectors as the head changes its position in the operating zone. Prior art mechanical spring based tensioners are affected by operating orientation. This can result in tension variations from gravity loads affecting the force response of the dancer roll spring.

SUMMARY

A tensioning system for composite material delivered from a creel for composite material layup is passive in that it can only provide back tension, and has no ability to reverse the tow feed direction. The passive system uses a dynamically controlled drag brake on the material spool shaft, and a dancer roll mounted on a dynamically controlled linear slide. The force exerted on both the brake and the dancer roll slide can be continuously varied by a control system. The material spool shaft has an encoder mounted to it to provide angular position feedback control for the spool, and the dancer roll slide has a linear position feedback device to measure its position. The device uses pneumatic based force output devices. The feedback signals are interpreted by a controller to output control signals to electro pneumatic regulators that vary pressure force on a drag brake and liner slide cylinders.

DESCRIPTION OF THE PREFERRED EMBODIMENT

Figure 1:
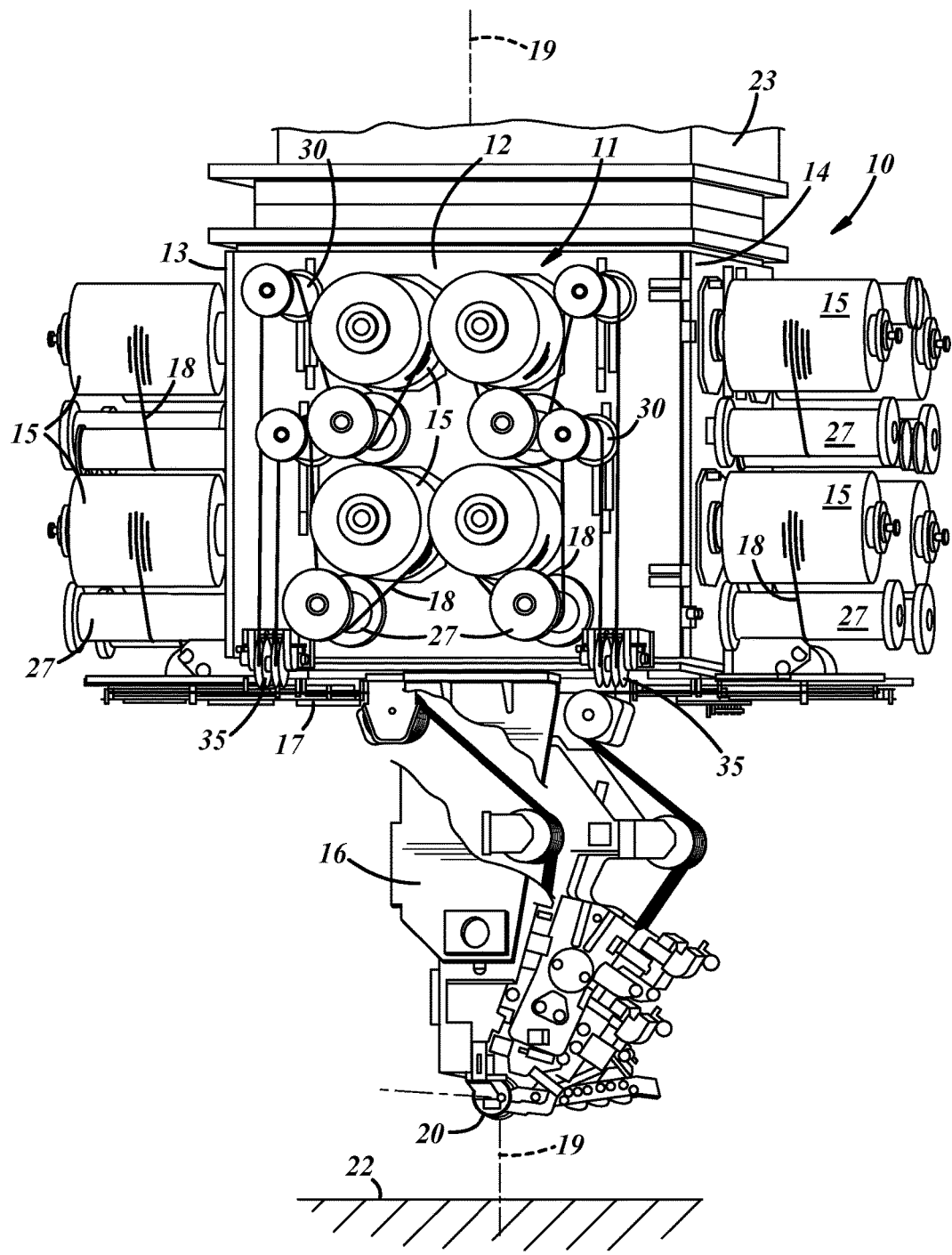
FIG. 1 is a side view of a creel showing the composite material spools, dancer rolls, and interleaver rollers mounted on the outside walls of the creel, and a composite placement head mounted on the bottom of the creel.

Turning now to FIG. 1, a creel with a head mounted thereon is generally designated by the reference numeral 10. The creel 11 has a generally rectangular shape and has generally rectangular side walls 12-14 (only 3 walls are shown) that provide support for a number of spools 15 of composite material or tow 18. A composite placement head 16 is attached to the underside or bottom wall 17 of the creel, and a compaction roller or shoe 20 is provided at the bottom of the head 16 to press the composite material 18 onto an application surface 22. The composite placement head 16 has a head centerline 19 which passes through the center of the creel 11 and the compaction roller or shoe 20. The creel 11 may be attached to the end of a positioning mechanism 23 which maneuvers the head 16 and the compaction roller 20 to various positions and locations so that the composite material may be applied in a desired location and pattern on the application surface 22. As used herein, the term composite material is used to designate resin impregnated fiber, tow, slit tape, prepreg materials, and other similar materials, all of which are well known to those skilled in the art, and all of which terms are used interchangeably in this application.

Figure 2:
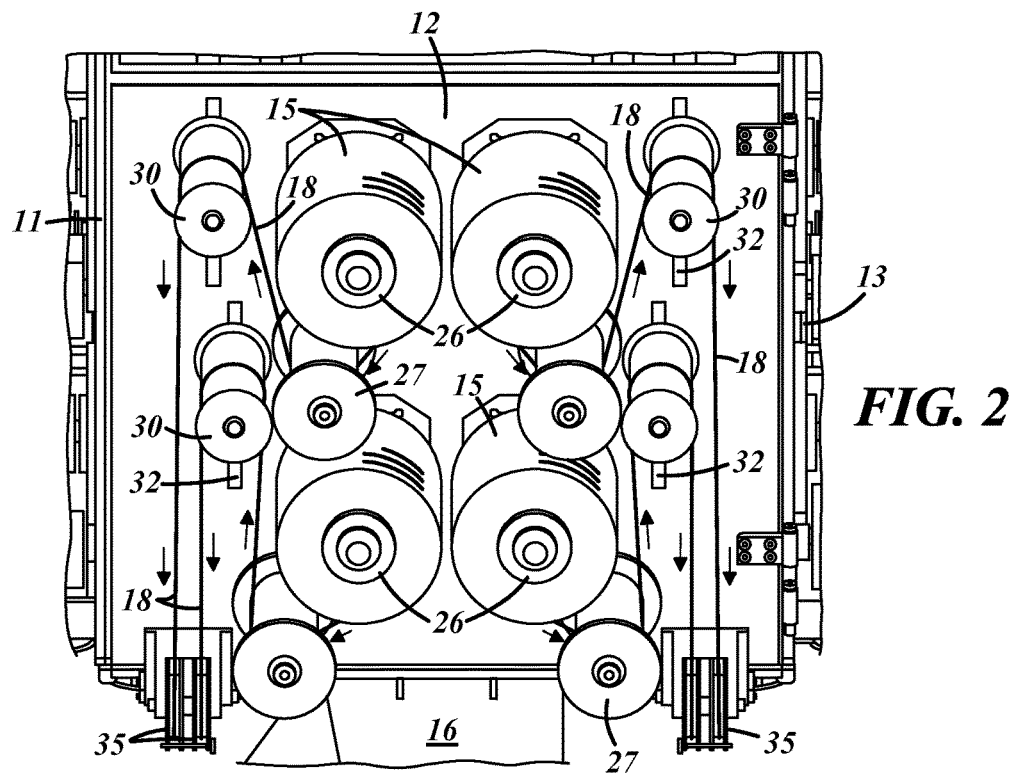
FIG. 2 is a detail view of one of the creel walls shown in FIG. 1 showing the path of composite material payout from the spools.

As shown in FIG. 2, the outside wall 12 of the creel 11 supports four spindles 26, each of which supports a spool 15 of composite material. Adjacent to each spindle 26 is an interleaver take-up roll 27 and a dancer roll 30. The interleaver take-up roll 27 winds up the paper separator strip from the spool 15 of composite material 18 for eventual disposal. The dancer roll 30 is mounted on a dancer roll support bracket 33 (best seen in FIG. 4) for sliding motion on a linear slide or way 32. Each dancer roll 30 has an axial length approximately equal to the axial length of the adjacent spool 15 of composite material 18 to allow a helical unwinding of the material 18 from the spool 15 without side loads being created on the material by the dancer roll 30.

FIG. 2 shows the path of the composite material 18 from the spool 15 to the interleaver take-up roll 27, then around the interleaver take-up roll 27 to the dancer roll 30, and around the dancer roll 30 to an edge roller 35 that directs the composite material 18 to the head 16. Each side of the remaining three adjacent sides of the creel 11 may have a similar outside wall with a similar pattern of spindles 26 and dancer rolls 30, or the outside walls of the creel 11 may have different numbers of spindles and dancer rolls, or may have a different pattern of spindles and dancer rolls depending on packaging and performance requirements.

Figure 3:
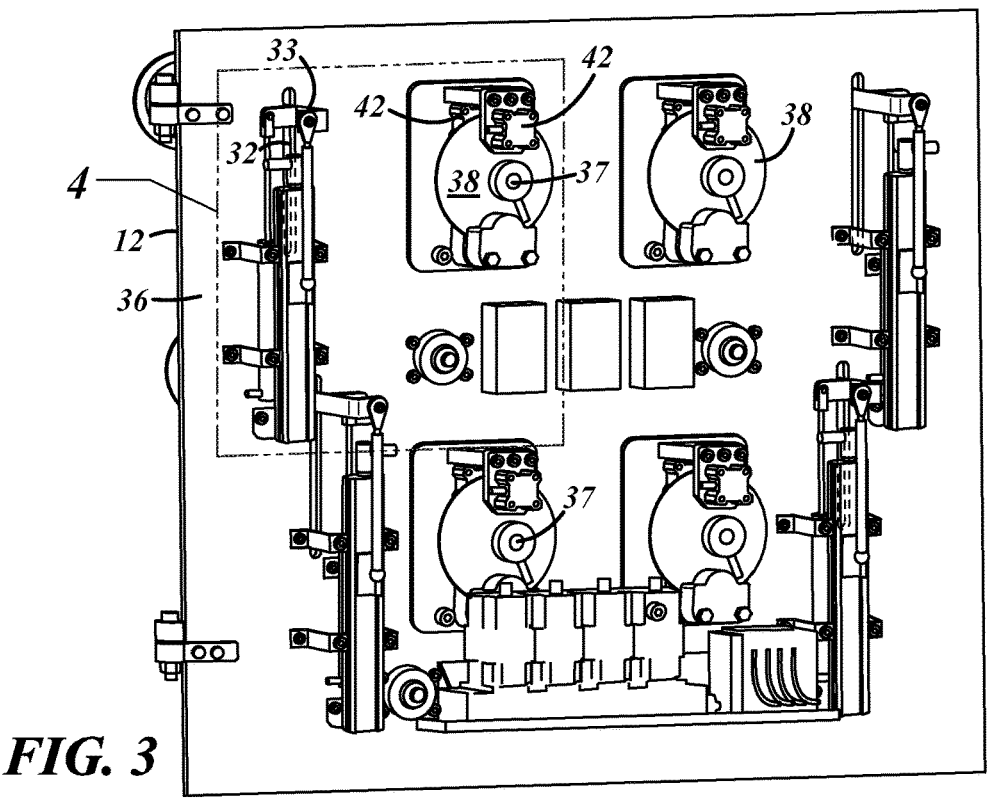
FIG. 3 shows the opposite side of the creel wall of FIG. 2.
Figure 4:
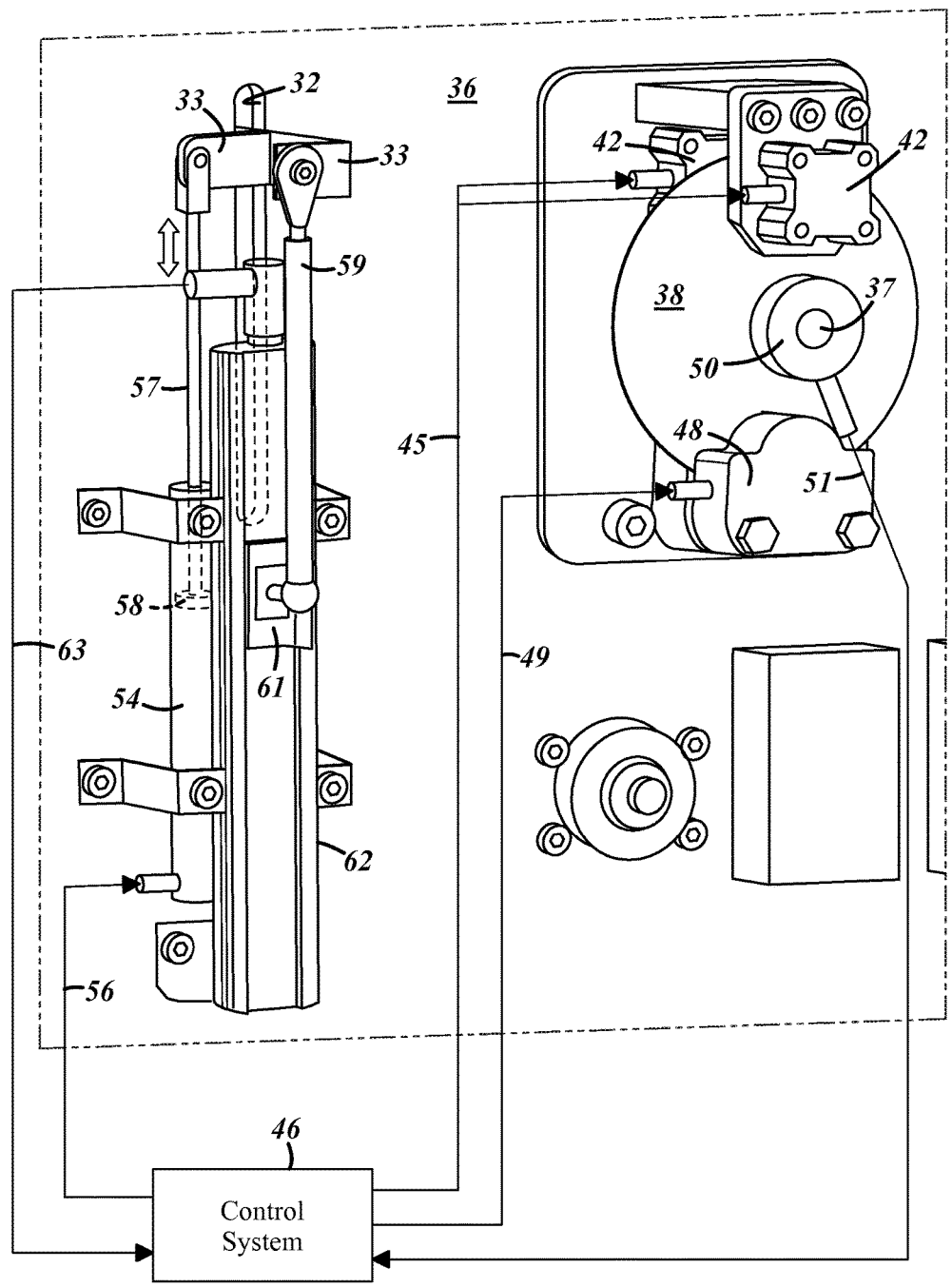
FIG. 4 is a detail view of section 4 of the tensioning mechanisms shown in FIG. 3.

FIG. 3 shows the back surface 36 of the outside creel wall 12 of FIG. 2, and FIG. 4 is a detail view of the one of the tensioning mechanisms shown in FIG. 3. The shaft 37 from each of the spindles 26 on the front of the outside wall 12 extends through the wall 12 and has a brake rotor 38 attached to it. One or more drag brake cylinders 42, each having a brake pad (not shown) may coupled to the wall 36 in proximity to the surface of the brake rotor 38. If two drag brake cylinders 42 are used, they may be coupled to the wall 36 on opposite sides of the brake rotor 38 in a mirror image position relative to one another. The drag brake cylinders 42 are coupled by a drag brake control line 45 to a control system 46. The drag brake cylinders 42 may be electrical, hydraulic or pneumatically operated. In the preferred embodiment, pneumatic brakes were used. A locking brake 48 having a brake mechanism that engages one or both sides of the brake rotor 38 may be attached to the wall 36. The locking brake 48 may have a locking brake control line 49 that is coupled to the control system 46. The locking brake 48 may be electrical, hydraulic or pneumatically operated. In the preferred embodiment, a pneumatic brake was used. A rotary encoder 50 may be attached to the end of the shaft 37 from the spindle 26, and the output signals from the rotary encoder 50 may be coupled by an encoder cable 51 to the control system 46.

A dancer roll cylinder 54 may be provided for each of the dancer rolls 30 on the front of the outside wall 12. The dancer roll cylinder 54 may be coupled to the control system 46 by a dancer roll cylinder line 56. Each dancer roll cylinder 54 may have a cylinder rod 57 connected to a piston 58 inside of the cylinder 54. The cylinder rod 57 may be coupled to the dancer roll support bracket 33 that extends through the linear slide or way 32 on wall of the creel and may be coupled to a dancer roll 30 on the front of the outside wall 12. Each dancer roll support bracket 33 may be coupled to a connecting rod 59 that is coupled to an input slide 61 on a linear position feedback sensor such as linear variable displacement transformer (LVDT) 62 that is mounted on the surface 36. The LVDT 62 may generate signals representing the movement of the dancer roll cylinder 30, and sends the signals via a LVDT cable 63 to the control system 46. The dancer roll cylinder 30 may be electrical, hydraulic or pneumatically operated. In the preferred embodiment, a pneumatic cylinder was used.

Figure 5:
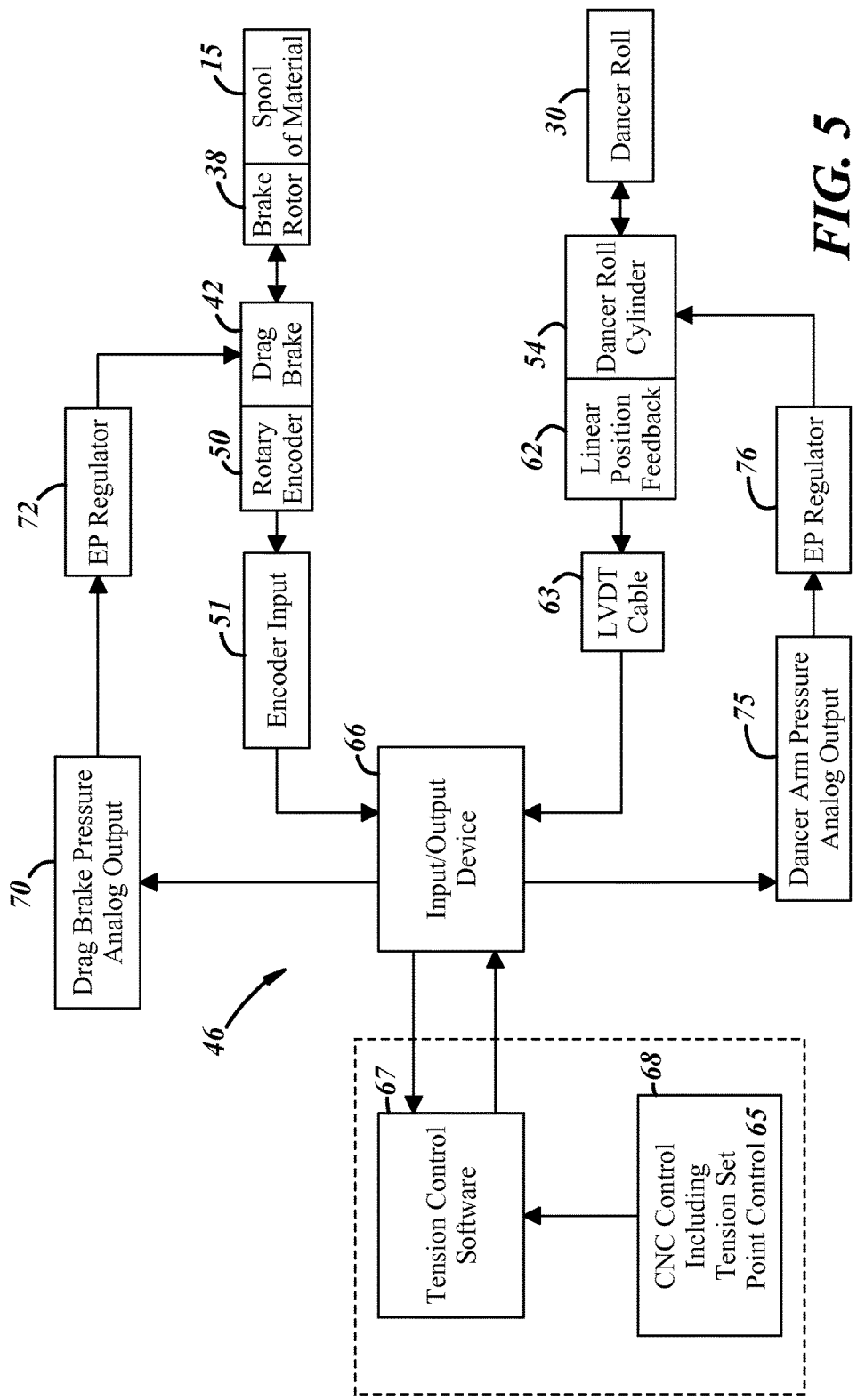
FIG. 5 is a block diagram of the control system for the tensioning system.

FIG. 5 is a block diagram of the control system 46 for the passive tensioning system described in connection with FIGS. 1-4. The composite placement system uses a CNC control 68 which determines the movement of the head 16 relative to the application surface 22 and the placement of composite material on the application surface 22 by the head 16. A value for the tension of the composite material may be set by an operator by means of a tension set point control 65 contained in the CNC control 68. The tension set point is then processed by the tension control software 67, and the tension control software 67 operates together with the CNC control 68 to meter the payout of composite material 15 from the head 16. The tension control software 67 couples commands to an input/output device 66 such as an industrial IO system. The input/output device 66 generates a drag brake pressure analog output signal 70 that is coupled to a drag brake electro-pneumatic regulator 72. The regulator 72 is coupled to the drag brake cylinders 42 which act on the rotor 38 that is coupled to the spool of material 15. The rotation of the spool of material 15 is sensed by the encoder 50 which generates an encoder input 51 that is coupled to the input/output device 66.

The input output device 66 also generates a dancer arm pressure analog output signal 75 that is coupled to a dancer arm electro-pneumatic regulator 76 the output of which is coupled to the dancer roll cylinder 54. Changing the pressure in the dancer roll cylinder 54 changes the response characteristics of the dancer roll 30. The position of the dancer roll 30 is sensed by the linear position feedback cylinder 62. The linear position feedback cylinder 62 generates a signal that is coupled by the LVDT cable 63 to the output device 66.

In operation, the tensioner system adjusts dynamically to the specific operations that are being performed by the composite placement system. The force of the dancer roll 30 is adjusted by the electro-pneumatic regulator 76 and the dancer roll cylinder 54 so that the dancer roll 30 acts like an adjustable spring. The dancer roll cylinder 54 may be a double acting cylinder that may have a constant back pressure on the end carrying the cylinder rod 57 and an adjustable pressure on the end which is coupled to the dancer roll cylinder cable 56 to produce a smooth, varying, spring force movement. Other cylinder designs may be used. Increasing the pressure in the dancer roll cylinder 54 increases the force necessary to depress the dancer roll 30 from the top of its travel in the linear slide or way 32 to the bottom. The force of the drag brakes 42 on the brake rotor 38 and the spring force on the dancer roll 30 vary with the signal from the tension set point control 65 that may be set into the control system 68 by the operator. The tension set point control is typically set to that the tension on the tow is less than one pound. Signals from the rotary encoder 50 may be used to determine the diameter of the composite material on the spool 15, the inertia of the spool 15, the speed of rotation of the spool 15, and the acceleration of the spool 15. Using this data, the dancer roll spring force may be adjusted dynamically by the tension control software 67 based on the diameter of the spool 15, the inertia of the spool 15, and the acceleration of the spool 15. The force of the drag brakes 42 on the spool is dynamically adjusted based on the diameter of the spool 15, the inertia of the spool 15, and the speed and acceleration of the spool 15.

The tensioner is used on a composite placement system during the time that composite material on the spool 15 is fed out and applied to a surface 22. At the end of a laydown path, the feed of material 18 to the head 16 may be abruptly stopped so that the material 18 may be cut as needed. These operations may be performed as fast as possible, resulting in high spool accelerations and decelerations. The CNC control 68 commands when these operations are to occur. During these occurrences, the timing and amount of the force on the drag brakes 42, and the timing and amount of force exerted by the pneumatic cylinder 54 on the dancer roll 30 may be instantaneously adjusted in real time.

In preparation for a material payout operation, the dancer roll 30 is pushed to the top of the linear slide 32 before the payout of composite material occurs. This allows the dancer roll 30 to have the maximum travel range as the tow 18 is fed out at high speed. When a tow feed command is sent from the controller 68, the dancer roll travels 30 towards bottom of the linear slide 32 as tow 18 is fed out from a material spool 15 in order to absorb a portion of the acceleration force on the material spool 15. This reduces the tension on the tow 18 during the feed operation which helps to maintain the tow set tension accuracy and the tow laydown position accuracy. The control of the dancer roll 30 by the pneumatic cylinder 54 allows the control system to optimize the motion of the dancer roll to help control the tension on the tow 18 during the various operations. Controlling the dancer roller 30 with the pneumatic dancer roll cylinder 54 allows the spring rate of the dancer roll 30 to change as needed to compensate for various dynamic events, such as a different size roll of material, or a different tension setpoint, or an extremely high acceleration or deceleration. The spring rate of the pneumatic cylinder 54 can also be varied as a function of the position of the dancer roll 30.

During a cutting operation, the supply of tow 18 from the spool 15 needs to stop suddenly. The drag brakes 42 are tightened against the brake rotor 38 to stop the spool 15 quickly to prevent the tow from unspooling. Additionally, the pressure in the dancer roll cylinder 54 is altered to cushion the stopping motion of the system.

The creel 11 may be mounted on the end effector 23 of a composite placement machine. As the end effector 23 is maneuvered in three directions under the control of the CNC control 68, the creel 11 is tilted. Tilting the creel 11 repositions the gravity vector relative to the head centerline 19, and the effective force due to the component weight of the dancer roll 30 changes and may be programmed into the CNC control 68. The pressure in the dancer roll cylinder 54 may be changed accordingly in order to compensate for the gravity vector force change seen by the dancer roll 30 due to the repositioning of the dancer roll 30 relative to gravity.

The encoder 50 is mounted to the material spool shaft 37 to detect the change of angular position of the spool 15 in response to a payout command in order to compute the diameter of the spool 50 in real time. The real time diameter of the spool 50 is used to adjust the force of the drag brakes 42 on the brake rotor 38 and the effective spring force on the dancer roll 30 to control the tension on the tow 18 more effectively.

The locking brake 48 is provided to lock the brake rotor 38 and thereby the spool 15 against rotation during certain machine modes such as for head servicing, head changing, or spool changing.

The passive tensioner described above provides the following advantages:

1. The elimination of expensive bidirectional servoed tensioner motors controlling the tension.
2. The ability to operate in all orientations.
3. The ability to be tightly packaged on a head that includes a creel.
4. The ability to operate at low set point tensions of less than one half-pound.
5. The ability to separate the effects of spool inertial loads from changing the low tension control of the tow.

If the spools and passive tensioner described above reside in a creel that is separate from the head, and the head moves toward and away from the creel thus generating fiber slack, a fiber festoon may be used to take up the slack. A fiber festoon will enable real time slack elimination during machine motion to compensate for the passive tensioner's inability to reverse to remove fiber slack. Although the device described uses pneumatic based force output devices, those skilled in the art will understand that electric force output devices may be used.

Having thus described the device, various modifications and alterations will occur to those skilled in the art, which modifications and alterations are intended to be within the scope of the invention as defined by the appended claims.

We claim:

1. A passive tensioning system for composite material dispensed by a composite placement machine in which material on a spool mounted on a spool shaft is pulled off over a dancer roll and applied to a surface, the passive tensioning system comprising:
   a drag brake on the spool shaft;
   a drag brake control for the drag brake;
   the dancer roll mounted on a linear slide having a spring force;
   a slide control for varying the spring force for the linear slide; and,
   a control system for continually varying the drag brake control and the slide control to control the tension of the composite material based on the instantaneous operating characteristics of the composite placement machine, wherein the dancer roll, the drag brake control, and the slide control are carried by a composite placement head and creel assembly; and the dancer roll spring force is dynamically adjustable based on the change of the gravity vector on the dancer roll as the tensioning system is tilted relative to the gravity vector.

2. The passive tensioning system of claim 1 further comprising:
   a linear position feedback device for the linear slide, whereby the spring force for the linear slide is varied according to a position of the linear slide.

3. The passive tensioning system of claim 1 further comprising:
   an encoder mounted on the spool shaft to provide angular position feedback for the spool, whereby the drag brake control is varied according to the change in angular position of the spool.

4. The passive tensioning system of claim 1 further comprising:
   a pneumatic cylinder coupled to the linear slide, whereby the dancer roll spring force may be adjusted by varying the pressure in the pneumatic cylinder.

5. The passive tensioning system of claim 4 further comprising:
   the pneumatic cylinder for adjusting the dancer roll spring force, whereby the dancer roll acts like an adjustable spring.

6. The passive tensioning system of claim 5 further comprising:
   a double acting cylinder comprising the pneumatic cylinder.

7. The passive tensioning system of claim 4 further comprising:
   a linear position feedback device for the dancer roll, whereby the dancer roll spring force may be varied according to the linear position of the dancer roll.

8. The passive tensioning system of claim 1 further comprising:
   a tension set point control for the control system, whereby the tension on the composite material can be set to a specific value, and whereby a braking force applied by the drag brake and the spring force on the dancer roll is varied according to the tension set point control.

9. The passive tensioning system of claim 1 further comprising:
   a spool diameter measuring system for measuring the diameter of the spool as composite material is fed out from the spool, whereby the drag brake force is adjusted dynamically based on the diameter of the spool.

10. The passive tensioning system of claim 1 further comprising:
    a rotary encoder coupled to the spool shaft and having an encoder output signal, the encoder output signal coupled to the control system, whereby the control system measures the acceleration of the spool and the inertia of the spool, and whereby the drag brake force is dynamically adjusted based on the acceleration of the spool and the inertia of the spool.

11. The passive tensioning system of claim 10 wherein the control system measures the speed of rotation of the spool, whereby braking force applied by the drag brake on the spool shaft is adjusted based on the speed of rotation of the spool.

12. The passive tensioning system of claim 1 wherein the dancer roll spring force is dynamically adjustable based on the position of the dancer roll linear slide.

13. The passive tensioning system of claim 1 wherein the dancer roll spring force is dynamically adjustable based on the inertia of the spool.

14. The passive tensioning system of claim 1 wherein the dancer roll spring force is dynamically adjustable based on the acceleration of the spool.

15. The passive tensioning system of claim 1 wherein the spool has a diameter and the drag brake on the spool is dynamically adjustable based on the diameter of the spool.

16. The passive tensioning system of claim 1 wherein the spool has an inertia and the drag brake on the spool is dynamically adjustable based on the inertia of the spool.

17. The passive tensioning system of claim 1 wherein the spool has a speed of rotation and the drag brake on the spool is dynamically adjustable based on the speed of rotation of the spool.

18. The passive tensioning system of claim 1 wherein the spool has an acceleration and the drag brake on the spool is dynamically adjustable based on the acceleration of the spool.

* * * * *